United States Patent [19]
Akazaki et al.

[11] Patent Number: 5,199,403
[45] Date of Patent: Apr. 6, 1993

[54] AIR FUEL RATIO CONTROL SYSTEM FOR VARIABLE VALVE TIMING TYPE INTERNAL COMBUSTION ENGINES

[75] Inventors: Shusuke Akazaki; Hidehito Ikebe, both of Wako, Japan

[73] Assignee: Honda Giken Kogyo Kabushiki Kaisha, Tokyo, Japan

[21] Appl. No.: 911,028

[22] Filed: Jul. 9, 1992

[30] Foreign Application Priority Data

Jul. 29, 1991 [JP] Japan .................................. 3-211671

[51] Int. Cl.⁵ .............................................. F02B 29/08
[52] U.S. Cl. ................................. 123/478; 123/90.15
[58] Field of Search .................. 123/90.15, 90.16, 478, 123/492

[56] References Cited
U.S. PATENT DOCUMENTS

| | | | |
|---|---|---|---|
| 4,730,587 | 3/1988 | Norota et al. | 123/416 |
| 4,926,823 | 5/1990 | Kishi et al. | 123/90.16 X |
| 4,938,187 | 7/1990 | Seki | 123/90.16 X |
| 4,938,188 | 7/1990 | Seki et al. | 123/90.16 X |
| 5,022,357 | 6/1991 | Kawamura | 123/90.15 X |

OTHER PUBLICATIONS

Patent Abstracts of Japan, vol. 009, No. 272, Group M425, published Oct. 1985 (abstract of JP60116834).

*Primary Examiner*—Tony M. Argenbright
*Attorney, Agent, or Firm*—Lyon & Lyon

[57] ABSTRACT

An air-fuel ratio control system for an internal combustion engine having at least one intake valve with its valve timing changeable at least between low-speed valve timing suitable for engine operation in a low engine rotational speed region, and high-speed valve timing suitable for engine operation in a high engine rotational speed region. When changeover is to be effected from the low-speed valve timing to the high-speed valve timing, an ECU changes the desired air-fuel ratio to be applied when the low-speed valve timing is selected, to one to be applied when the high-speed valve timing is selected, and changes the valve timing to the high-speed valve timing after the desired air-fuel ratio has been changed to the one to be applied when the high-speed valve timing is selected.

7 Claims, 14 Drawing Sheets

AIR FUEL RATIO CONTROL SYSTEM FOR VARIABLE VALVE TIMING TYPE INTERNAL COMBUSTION ENGINES

BACKGROUND OF THE INVENTION

Field of the Invention

This invention relates to an air-fuel ratio control system for internal combustion engines, and more particularly to an air-fuel ratio control system for internal combustion engines having intake values with variable valve timing.

Internal combustion engines are conventionally known, which are provided with a variable timing system for varying valve timing of intake valves, i.e. valve opening period and/or valve lift, in dependence on the engine rotational speed.

Such variable valve timing systems are generally adapted to change the valve timing between high-speed valve timing (high-speed V/T) suitable for engine operation in a high engine rotational speed region and low-speed valve timing (low-speed V/T) suitable for engine operation in a low engine rotational speed region, to thereby enhance the trapping efficiency (combustion efficiency) and hence obtain higher engine output.

Further, the variable valve timing systems are also adapted to vary the valve timing in response to operating conditions of the engine including the engine rotational speed and load on the engine so as to always ensure the best combustion efficiency during operation of the engine.

In internal combustion engines with such valve timing systems, in changing from low-speed V/T to high-speed V/T, the engine output torque is reduced immediately before the valve timing is changed from low-speed V/T to high-speed V/T so that the changeover to high-speed V/T takes place with the engine output torque reduced, in order to avoid a large shock due to a sudden change in the output torque caused by the changeover of the valve timing (torque shock).

This will be further explained with reference to FIG. 1 showing output torque characteristics assumed at high-speed V/T and low-speed V/T. In the figure, the abscissa represents the engine rotational speed NE, and the ordinate the output torque PSE.

It will be learned from FIG. 1 that different output torque characteristics are assumed between high-speed V/T and low-speed V/T, which results in a torque shock, e.g. when the engine shifts from a so-called "lean burn" operation with low-speed V/T selected in which the air-fuel ratio of a mixture supplied to the engine is controlled to a leaner value than a stoichiometric air-fuel ratio, to an operation with high-speed V/T selected in which the air-fuel ratio is controlled to the stoichiometric air-fuel ratio or a richer value than the latter. To overcome this disadvantage, conventionally it is so controlled that in changing from low-speed V/T to high-speed V/T, the ignition timing of the engine is retarded to a point where the maximum engine output torque is obtained with low-speed V/T selected to reduce the output torque to be obtained with high-speed V/T selected, as indicated by the arrow a, then change the valve timing from low-speed V/T to high-speed V/T in a hatched region indicated by x, and thereafter gradually return the output torque toward a value to be obtained with high-speed V/T selected, to thereby mitigate the torque shock.

However, according to the prior art described above, although in changeover to high-speed V/T, actually the engine is required to produce high output torque, the output torque is temporarily dropped for changing the valve timing, resulting in insufficient output torque. It is therefore desirable that changeover of the valve timing should be effected without a drop in the engine output torque.

SUMMARY OF THE INVENTION

It is, therefore, the object of the invention to provide an air-fuel ratio control system for a variable valve timing type internal combustion engine, which is capable of mitigating a torque shock at the time of changing from low-speed V/T to high-speed V/T, without a drop in the engine output torque.

To attain the above object, the present invention provides an air-fuel ratio control system for an internal combustion engine having at least one intake valve, and valve timing changing means for changing valve timing of the at least one intake valve at least between low-speed valve timing suitable for operation of the engine in a low engine rotational speed region, and high-speed valve timing suitable for operation of the engine in a high engine rotational speed region.

The air-fuel ratio control system according to the invention comprises:

- operating condition detecting means for detecting operating conditions of the engine;
- air-fuel ratio calculating means for calculating a desired air-fuel ratio of a mixture supplied to the engine in response to the detected operating conditions of the engine;
- changeover detecting means for detecting whether or not the engine has entered a predetermined changeover region in which the valve timing is to be changed; and
- air-fuel ratio changing means for changing the desired air-fuel ratio when it is detected that the engine has entered the predetermined changeover region;
- wherein when changeover is to be effected from the low-speed valve timing to the high-speed valve timing, the air-fuel ratio changing means changes the desired air-fuel ratio to be applied when the low-speed valve timing is selected, to one to be applied when the high-speed valve timing is selected, and the valve timing changing means changes the valve timing to the high-speed valve timing after the desired air-fuel ratio has been changed to the one to be applied when the high-speed valve timing is selected.

In the changeover region, the desired air-fuel ratio to be applied when the high-speed valve timing is selected is set to a richer value than the desired air-fuel ratio to be applied when the low-speed valve timing is selected.

Preferably, the air-fuel ratio changing means progressively enriches the desired air-fuel ratio when a difference between a value of the desired air-fuel ratio assumed upon detection of entrance of the engine to the predetermined changeover region and an immediately preceding value thereof is larger than a predetermined value.

Also preferably, the system may include time measuring means for measuring time elapsed after the engine entered the predetermined changeover region, and after the measured time has reached a predetermined time period, the air-fuel ratio changing means changes the desired air-fuel ratio.

The above and other objects, features, and advantages of the invention will be more apparent from the following detailed description taken in conjunction with the accompanying drawings.

BRIEF DESCRIPTION OF THE DRAWINGS

FIGS. 3, 3(a) and 3(b) are a flowchart showing a program (main routine) for effecting air-fuel ratio feedback control;

DETAILED DESCRIPTION

The method according to the invention will now be described in detail with reference to the drawings showing an embodiment thereof.

Figure 2:
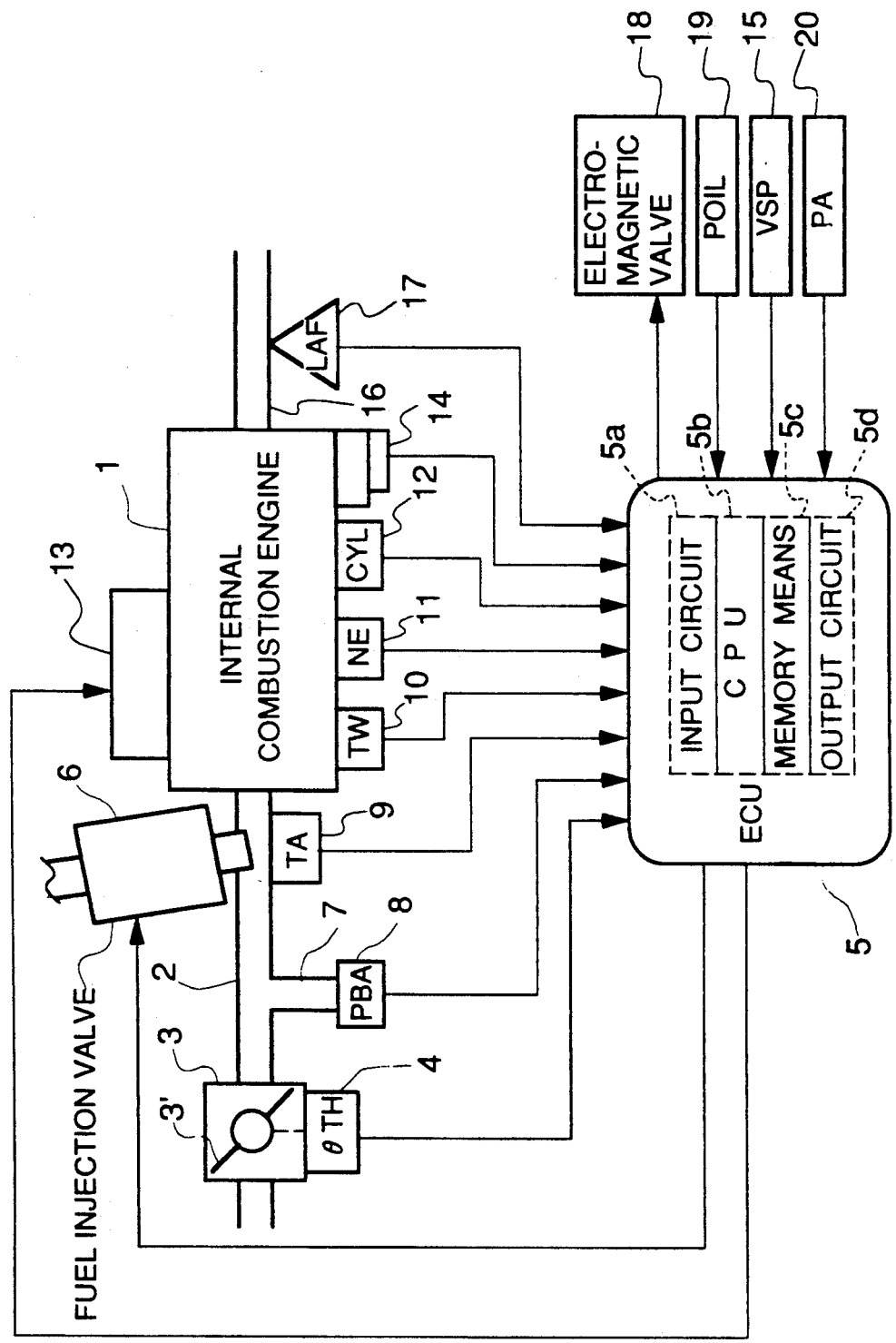
FIG. 2 is a block diagram showing the arrangement of an air-fuel ratio control system for an internal combustion engine according to an embodiment of the invention.

Referring first to FIG. 2, there is shown the whole arrangement of an air-fuel ratio control system for an internal combustion engine according to an embodiment of the invention. In the figure, reference numeral 1 designates an internal combustion engine of DOHC in-line 4 cylinder type for automotive vehicles, in which two pairs of inlet and exhaust valves, none of which is shown, are provided for each cylinder. The engine 1 is provided with valve timing changing means, hereinafter referred to, which can selectively change the valve timing of the intake valves between valve timing suitable for engine operation in a high engine rotational speed region (high-speed V/T) and valve timing suitable for engine operation in a low engine rotational speed region (low-speed V/T).

Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

An intake pipe absolute pressure ($P_{BA}$) sensor 8 is provided in communication with the interior of the intake pipe 2 at a location immediately downstream of the throttle valve 3' by way of a conduit 7 for supplying an electric signal indicative of the sensed absolute pressure within the intake pipe 2 to the ECU 5.

An intake air temperature ($T_A$) sensor 9 is inserted into the intake pipe 2 at a location downstream of the conduit 7 for supplying an electric signal indicative of the sensed intake air temperature $T_A$ to the ECU 5.

An engine coolant temperature ($T_W$) sensor 10, which may be formed of a thermistor or the like, is mounted in a cylinder wall of the cylinder block of the engine 1, for supplying an electric signal indicative of the sensed engine coolant temperature $T_W$ to the ECU 5.

An engine rotational speed (Ne) sensor 11 and a cylinder-discriminating (CYL) sensor 12 are arranged in facing relation to a camshaft or a crankshaft, not shown, of the engine 1. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

Spark plugs 13 are provided for respective cylinders of the engine 1 and connected to the ECU 5 which controls the ignition timing $\theta$ig of the spark plugs 13.

A transmission 14 is arranged between vehicle driving wheels, not shown, and the engine 1 such that the driving wheels are driven by the engine 1 through the transmission 14.

A vehicle speed (VSP) sensor 15 is mounted on each driving wheel for generating an electric signal indicative of the sensed vehicle speed VSP to the ECU 5.

A linear output-type oxygen concentration sensor (hereinafter referred to as "the LAF sensor") 17 is mounted in an exhaust pipe 16, for sensing the concentration of oxygen present in exhaust gases emitted from the engine 1 and supplying an electric signal indicative of the sensed oxygen concentration to the ECU 5.

Further, an electromagnetic valve 18 for valve timing changeover control, described hereinafter, is connected to the output side of the ECU 5 which controls opening and closing of the electromagnetic valve 18. The electromagnetic valve 18 is adapted to selectively change oil pressure supplied to a changeover mechanism, not shown, which changes the valve timing of the intake valves, to a high level or a low level so that the changeover mechanism is responsive to the oil pressure level to change the valve timing to high-speed V/T or low-speed V/T. The oil pressure supplied to the changeover mechanism is sensed by an oil pressure sensor (POIL)

19 which supplies an electric signal indicative of the sensed oil pressure to the ECU 5.

An atmospheric pressure (PA) sensor 20 is connected to the ECU 5 to supply same with an electric signal indicative of the sensed atmospheric pressure PA.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b, various maps, hereinafter referred to, and for storing results of calculations therefrom, etc., and an output circuit 5d which outputs driving signals to the fuel injection valves 6, the spark plugs 13, and the electromagnetic valve 18.

The CPU 5b operates in response to various engine operating parameter signals from the above-mentioned sensors to determine operating conditions in which the engine 1 is operating such as an air-fuel ratio feedback control region for controlling the air-fuel ratio in response to oxygen concentration in exhaust gases and open-loop control regions, and calculates, in accordance with the determined operating conditions, the valve opening period or fuel injection period $T_{OUT}$ over which the fuel injection valves 6 are to be opened, by the use of the following equation (1) for control in basic mode and the following equation (2) for control in starting mode, in synchronism with inputting of TDC signal pulses to the ECU 5:

$$TOUT = TiM \times KCMDM \times KLAF \times K_1 + K_2 \quad (1)$$

$$TOUT = TiCR \times K_3 + K_4 \quad (2)$$

where TiM represents a basic fuel injection period to be applied in basic mode, more specifically a basic fuel injection period of the fuel injection valves 6, which is determined from a TiM map, in accordance with the engine rotational speed Ne and the intake pipe absolute pressure $P_{BA}$. As the TiM map for determining the TiM value, a TiML map for low-speed V/T and a TiMH map for high-speed V/T are stored in a ROM of the memory means 5c.

TiCR is a basic fuel injection period to be applied in starting mode, and determined in accordance with the engine rotational speed NE and the intake pipe absolute pressure PBA, from a TiCR map stored in the ROM of the memory means 5c.

Figure 4:
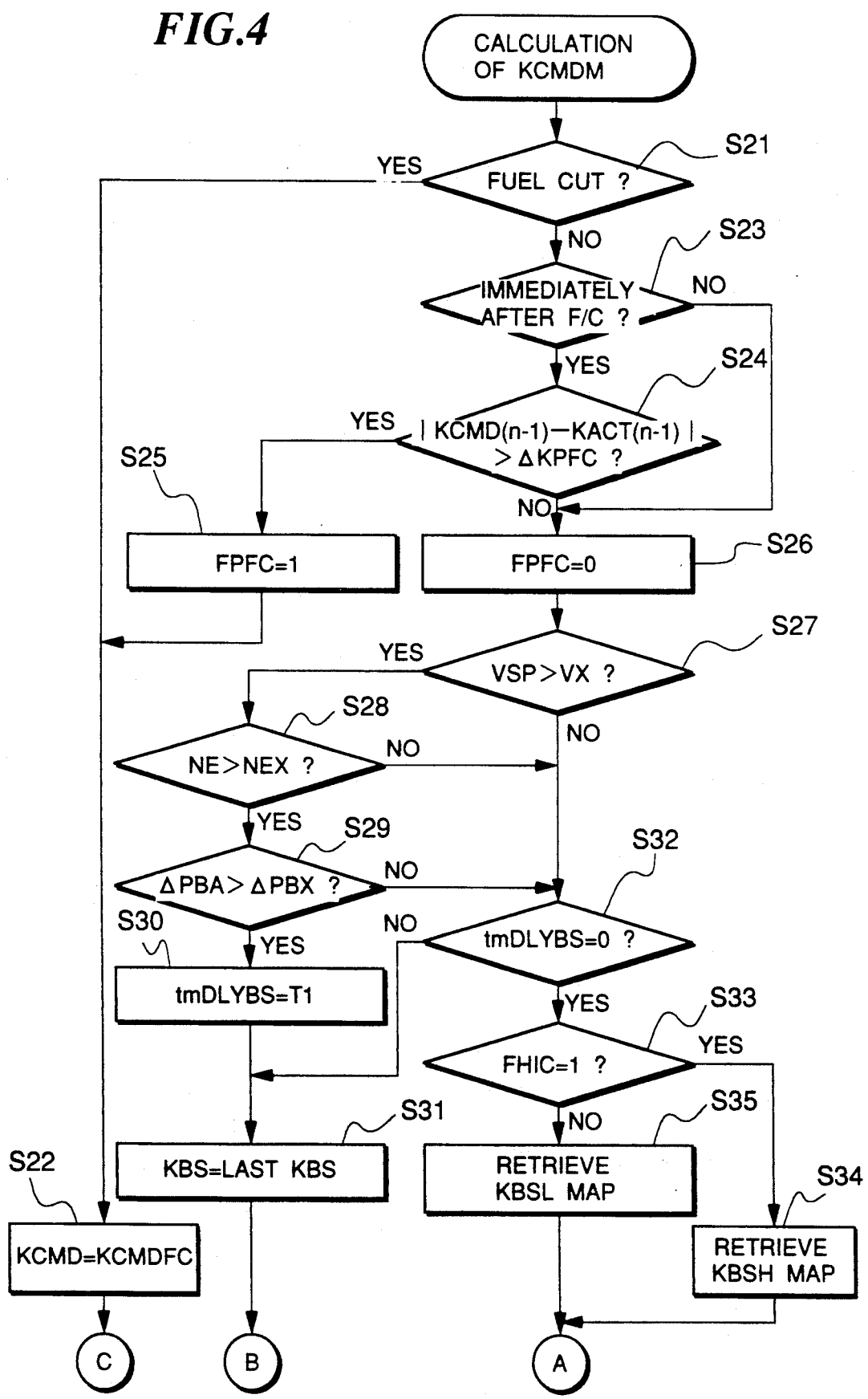
FIG. 4 is a flowchart showing part of a routine for calculating a corrected desired air-fuel ratio coefficient KCMDM.
Figure 5:
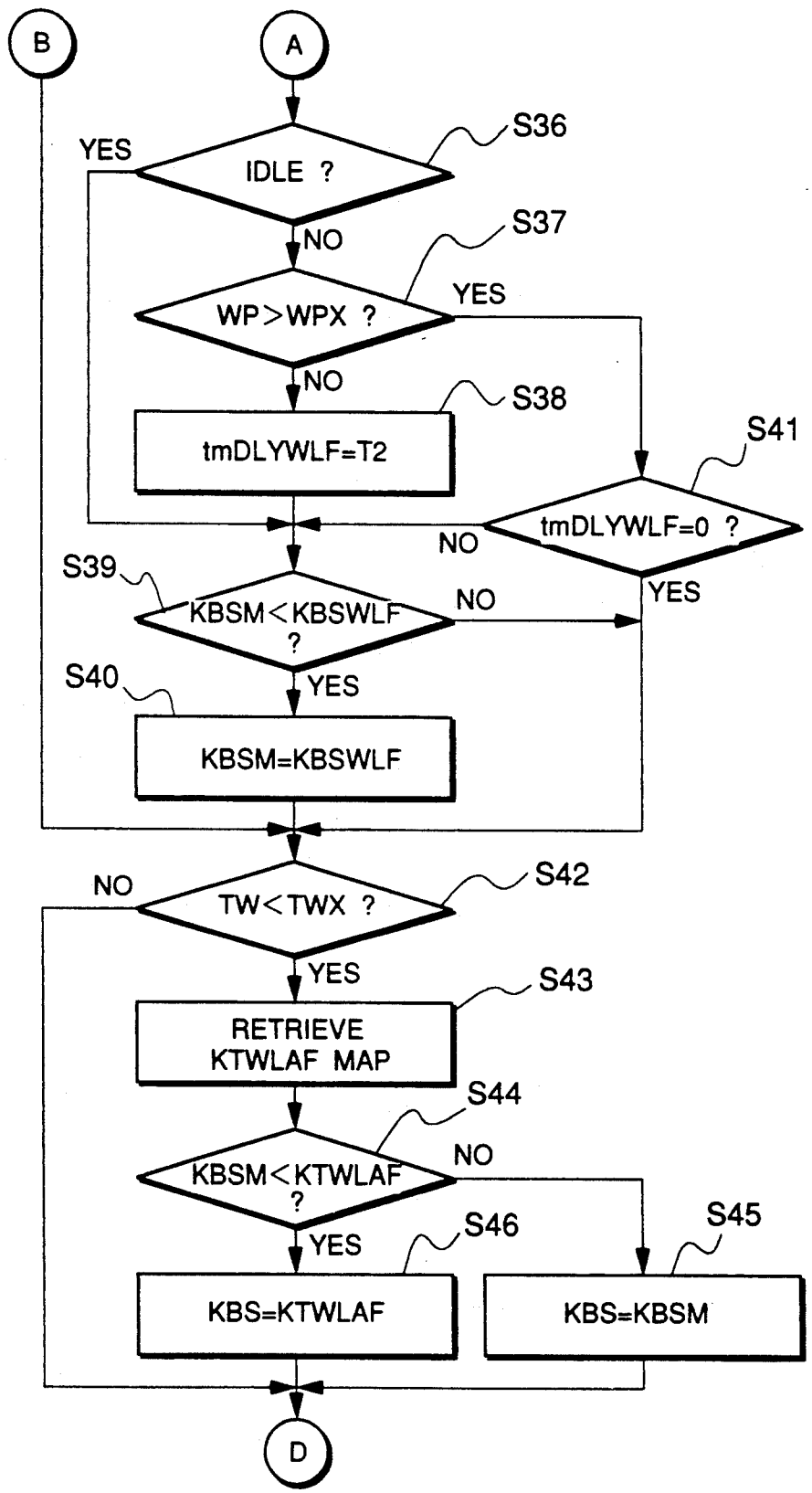
FIG. 5 is a flowchart showing another part of the routine of FIG. 4.
Figure 6:
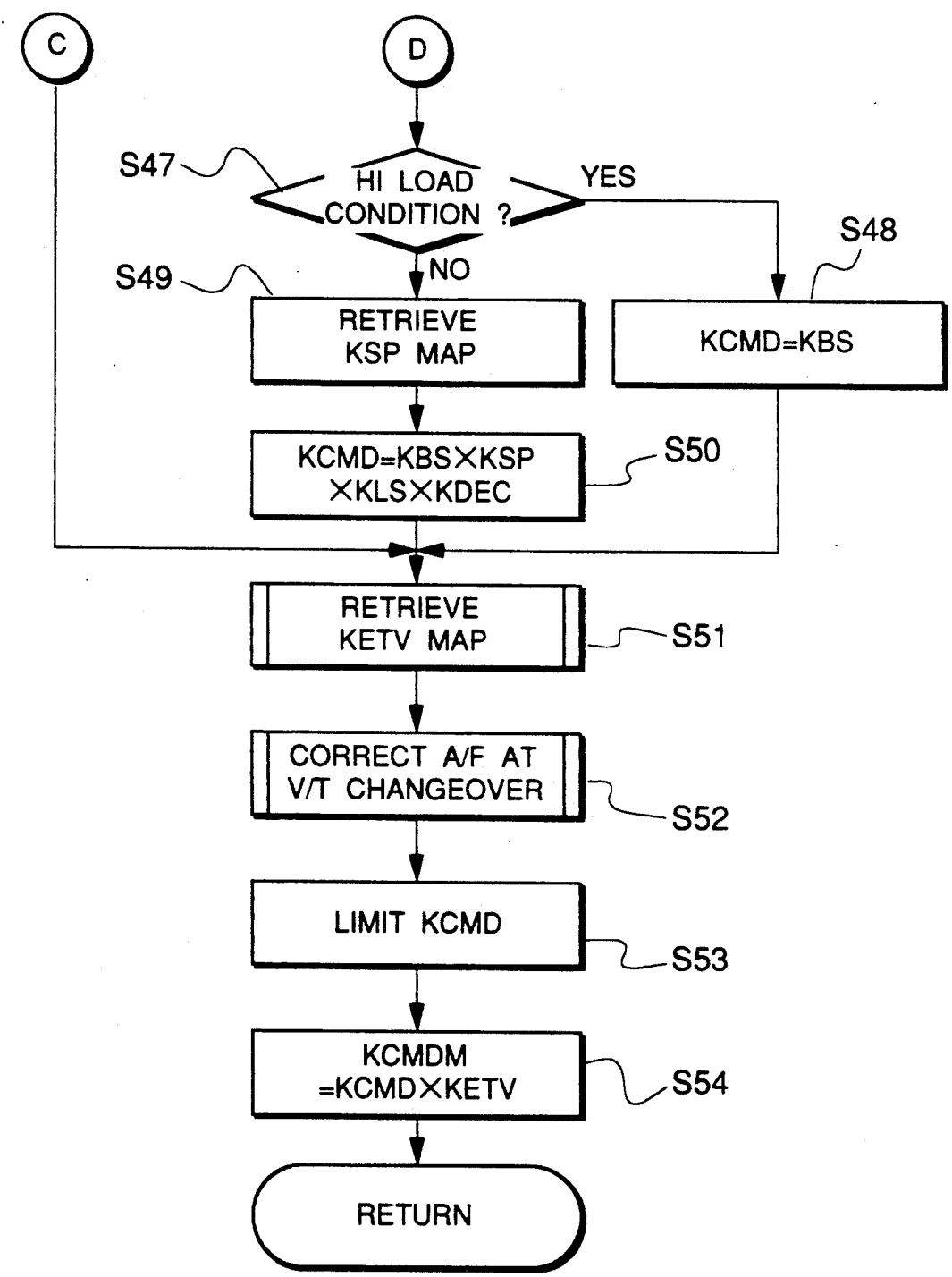
FIG. 6 is a flowchart showing a further part of the routine of FIG. 4.

KCMDM is a corrected desired air-fuel ratio coefficient which is calculated by a routine shown in FIGS. 4 to 6, by multiplying a desired air-fuel ratio coefficient KCMD set in accordance with engine operating conditions by a fuel cooling-compensating coefficient KETV.

The desired air-fuel ratio coefficient KCMD is calculated by the following equation (3) when the engine is in a predetermined high load operating condition, and by the following equation (4) when the engine is in another operating condition:

$$KCMD = KBS \quad (3)$$

$$KCMD = KBS \times KSP \times KLS \times KDEC \quad (4)$$

where KBS is a basic value of the desired air-fuel ratio coefficient KCMD, and normally read from a KBS map in accordance with the engine rotational speed NE and the intake pipe absolute pressure PBA, while it is read from a KTWLAF map in accordance with the engine coolant temperature TW and the intake pipe absolute pressure PBA when the engine coolant temperature TW is low. As the KBS map, a KBSH map for high-speed V/T and a KPSL map for low-speed V/T are stored in the ROM of the memory means 5c.

KSP is a vehicle speed-dependent coefficient which is set to such a predetermined value dependent upon the vehicle speed as can prevent surging, etc.

KLS is a mixture-leaning coefficient which is set to a predetermined value dependent upon the degree to which the air-fuel ratio of a mixture supplied to the engine i is to be leaned.

KDEC is a correction coefficient to be applied at engine deceleration, which is set to a predetermined value dependent upon a decelerating condition of the engine. More specifically, it is set to a value less than 1.0 at engine deceleration and to 1.0 at non-engine deceleration.

The fuel cooling-compensating coefficient KETV is to correct the fuel injection amount to compensate for a change in the density of intake air due to the cooling effect of fuel actually injected into the intake pipe 2, and set to a value corresponding to the desired air-fuel ratio coefficient KCMD. Incidentally, since the fuel injection period TOUT increases as the corrected desired air-fuel ratio coefficient KCMDM increases, it can be said that the KCMDM value is proportional to the reciprocal of the air-fuel ratio A/F.

KLAF is an air-fuel ratio correction coefficient which is set such that the air-fuel ratio sensed by the LAF sensor 18 becomes equal to a desired air-fuel ratio during air-fuel ratio feedback control, while it is set to a predetermined value appropriate to an operating condition in which the engine is operating, during air-fuel ratio open loop control.

$K_1$, $K_2$, $K_3$ and $K_4$ represent other correction coefficients and correction variables, respectively, which are calculated based on various engine parameter signals to such values as to optimize operating characteristics of the engine such as fuel consumption and accelerability, depending on operating conditions of the engine.

Next, the air-fuel ratio feedback control by the air-fuel ratio control system constructed as above will be described in detail with reference to FIG. 3.

Figure 3A:
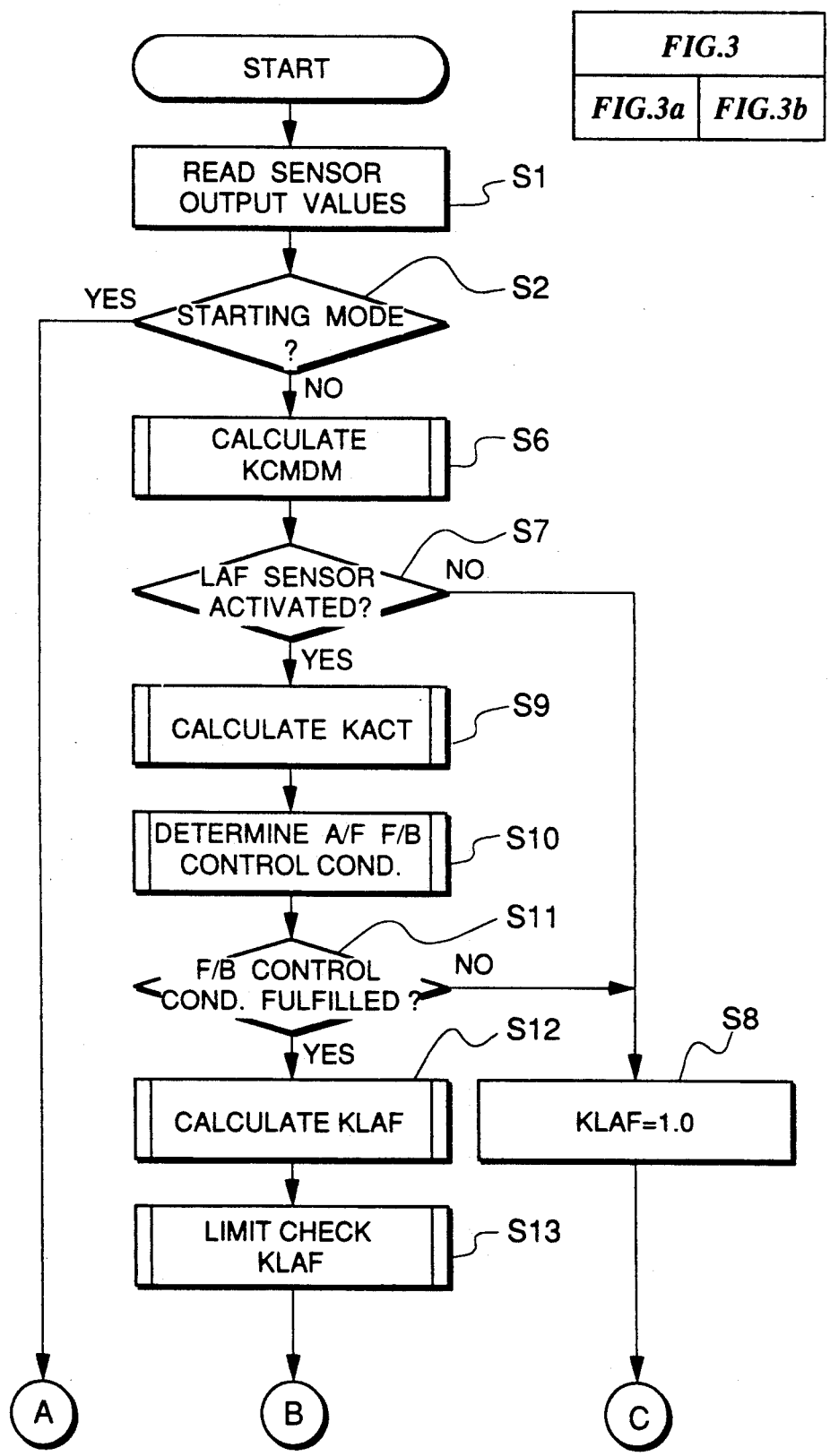
Figure 3B:
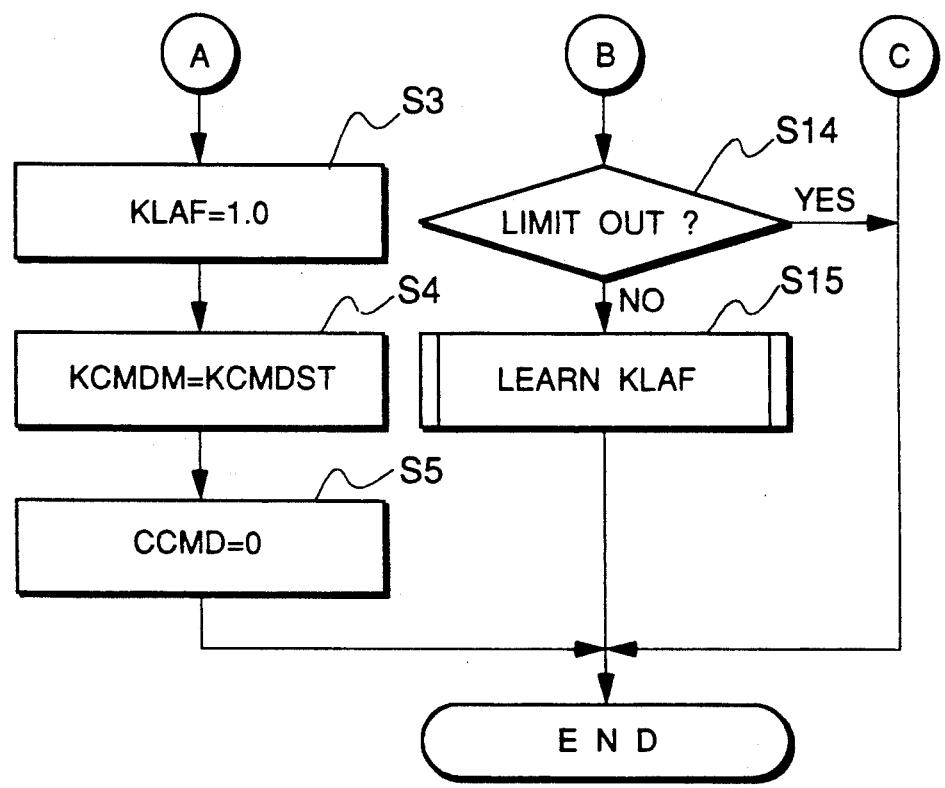

FIG. 3 shows a main routine for effecting the air-fuel ratio feedback control, which is executed in synchronism with inputting of TDC signal pulses.

Figure 1:
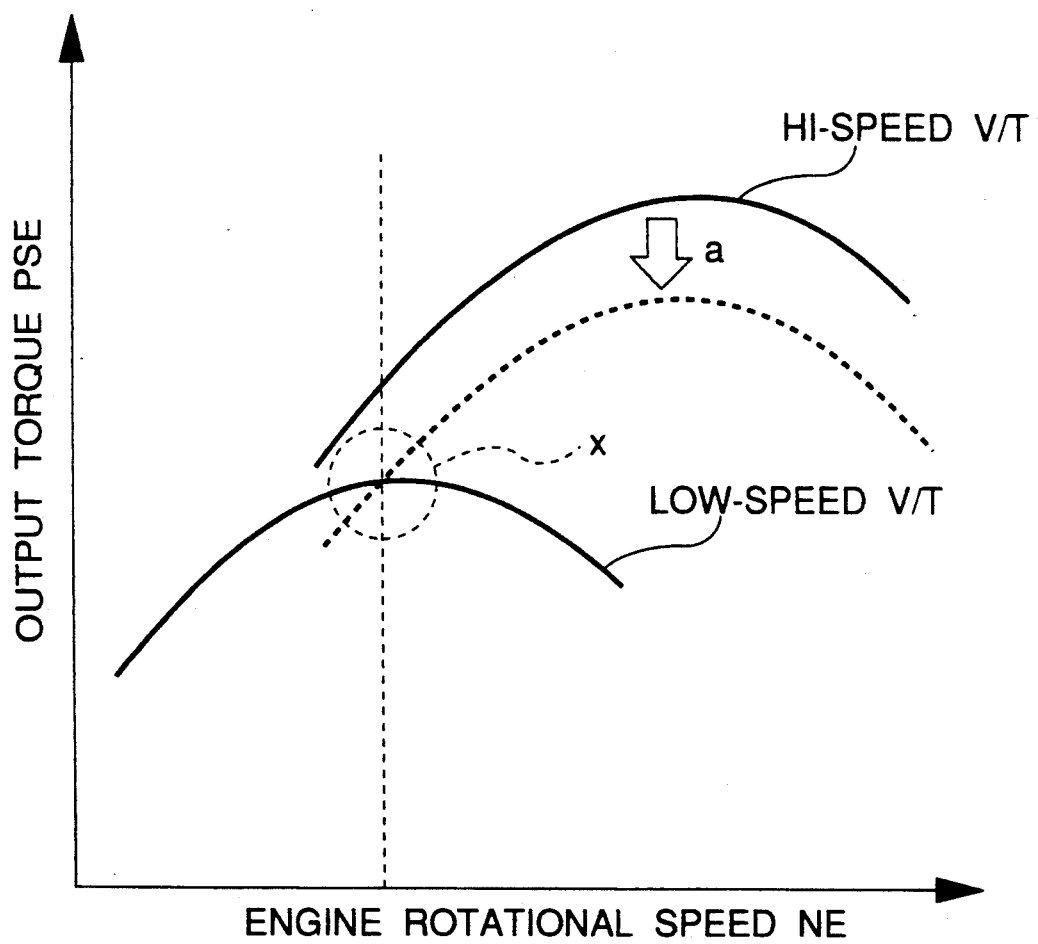
FIG. 1 is a graph useful in explaining a manner of changing the valve timing according to the prior art.

First, at a step S1 in FIG. 1 output values from the aforementioned various sensors are read by the ECU 5 and stored into a RAM of the memory means 5c.

Then, at a step S2, it is determined whether or not the engine is in starting mode. This determination is made by checking whether or not a starting switch, not shown, of the engine is closed and at the same time the engine rotational speed NE is below a predetermined cranking speed. When the engine is determined to be in starting mode, the air-fuel ratio correction coefficient KLAF is set to 1.0 at a step S3. Then, to prevent a variation in the value of the desired air-fuel ratio coefficient KCMD, the value of the coefficient KCMD is set to a predetermined value KCMDST (e.g. 1.1) appropriate to engine operation in starting mode, at a step S4, followed by setting the count value of a counter CCMD, which is used for limit checking of the KCMD value (FIG. 14), hereinafter described, to 0, at a step S5 and terminating the program.

On the other hand, when the answer to the question of the step S2 becomes negative (NO) in a subsequent loop, that is, when the staring mode or engine starting has been completed, the program proceeds to basic mode control wherein the value of the corrected desired air-fuel ratio coefficient KCMDM is calculated at a step S6. The calculation of the coefficient KCMDM is effected in a routine shown in FIGS. 4 to 6, in response to operating conditions of the engine, and the calculated KCMDM value is stored into the RAM of the memory means 5c.

Then, at a step S7 it is determined whether or not the LAF sensor 17 has become activated. The activation of the LAF sensor 17 is effected by an activation-determining routine, not shown, which is executed by background processing, i.e. in such a manner that when the difference between an output voltage VOUT from the LAF sensor 17 and a central value VCENT thereof is smaller than a predetermined value (e.g. 0.4 V), it is determined that the LAF sensor 17 has been activated.

When the answer to the question of the step S7 is negative (NO), the KLAF value is set to 1.0 at a step S8, followed by terminating the program.

On the other hand, when the answer to the step S7 is affirmative (YES), the program proceeds to a step S9 where the value of a detected air-fuel ratio correction coefficient KACT is calculated as the equivalent ratio of the detected air-fuel ratio A/F (=14.7/(A/F)) based upon the output voltage VOUT from the LAF sensor 17.

In the step S9, the value of the detected air-fuel ratio coefficient KACT is also corrected based upon the intake pipe absolute pressure PBA, the engine rotational speed NE and the atmospheric pressure PA, to compensate for a variation in the exhaust pressure, which is caused by variations in these parameters.

Then, a feedback-control determination routine, not shown, is executed at a step S10 to determine whether or not conditions for effecting air-fuel ratio feedback control are fulfilled, at a step S11. If the conditions are not fulfilled, for example, if the engine is in a fuel-cut condition, immediately after completion of fuel-cut, or in a low engine coolant condition (e.g. lower than $-25°$ C.), the KLAF value is set to 1.0 at a step S8, followed by terminating the program.

On the other hand, when the answer to the question of the step S11 is affirmative (YES), the program proceeds to a step S12 to calculate the air-fuel ratio correction coefficient KLAF. More specifically, proportional control (P-term control), integral control (I-term control) and differential control (D-term control) are carried out in known manners responsive to operating conditions of the engine so that the value of the detected air-fuel ratio coefficient KACT becomes equal to the desired air-fuel ratio coefficient KCMD, to obtain a P-term coefficient KP, an I-term coefficient KD, and a D-term coefficient KD, and these coefficient values are added together to obtain a value of the air-fuel ratio correction coefficient KLAF.

Then, limit checking of the coefficient KLAF value thus obtained is effected at steps S13, and S14. More specifically, the coefficient KLAF value is compared with predetermined upper and lower limit values KLAFH, KLAFL. If the answer to the question of the step S14, that is, if the KLAF value exceeds the upper limit KLAFH, the former is set to the latter, while if the KLAF value is below the lower limit KLAFL, the former is set to the latter. The execution of the step S14 is followed by termination of the program.

On the other hand, if the answer to the question of the step S14 is negative (NO), that is, if the KLAF value obtained at the step S12 falls within the range defined by the upper and lower limits KLAFH, KLAFL, a learned value KREF of the KLAF value (average value of KLAF) is calculated, and the KLAF value is set to the calculated average value KREF at a step S15, followed by terminating the program. Thereafter, the fuel injection period TOUT is calculated by the use of the aforementioned equation (1) to control the valve opening period of the fuel injection valves 6 thereby.

Further, the air-fuel ratio control system according to the invention includes changeover detecting means for detecting whether or not the engine has entered a predetermined valve timing changeover region, time measuring means for measuring time elapsed after the engine entered the valve timing changeover region, and air-fuel ratio changing means for changing the desired air-fuel ratio in response to changeover of the valve timing when the time period elapsed after the changeover detecting means detected that the engine entered the valve timing changeover region reached a predetermined time period. The above air-fuel ratio changing means includes air-fuel ratio enriching means for changing the desired air-fuel ratio toward a richer side when a changeover is made from low-speed V/T to high-speed V/T.

The above-mentioned means related to the valve timing are executed by the KCMDM calculating routine of the step S6 in FIG. 3.

FIGS. 4 to 6 show details of the KCMDM calculating routine, which is executed in synchronism with inputting of TDC signal pulses.

Referring first to FIG. 4, it is determined at a step S21 whether or not the engine 1 is in a fuel cut condition. This determination is made by a fuel cut-determining routine, not shown, based upon the engine rotational speed NE and the valve opening $\theta$TH of the throttle valve 3'.

If the engine is in the fuel cut condition, the desired air-fuel ratio coefficient KCMD is set to a predetermined value KCMDFC (e.g. 1.0) at a step S22, and then the program jumps to a step S51 in FIG. 6.

On the other hand, if the answer to the question of the step S21 is negative (NO), it is determined at a step S23 whether or not fuel cut has just been completed. This determination is made by starting a timer upon completion of fuel out and checking whether the timer has counted up a predetermined time period (e.g. 500 ms). If the answer is affirmative (YES), i.e. if the present loop is immediately after completion of fuel cut, it is determined at a step S24 whether or not the absolute value of the difference between an immediately preceding value $KCMD_{(n-1)}$ of KCMD and an immediately preceding value $KACT_{(n-1)}$ of KACT is larger than a predetermined value $\Delta$KAFC (e.g. 0.14). If the difference absolute value is larger than the predetermined value $\Delta$KAF, a flag FPFC is set to 1 at a step S25 to indicate that the present loop is immediately after completion of fuel cut, and then at a step S22 the desired air-fuel ratio coefficient KCMD is set to a predetermined value KCMDFC, followed by the program proceeding to a step S51 in FIG. 6.

On the other hand, if the step S23 or S24 provides a negative answer (NO), the flag FPFC is set to 0, follower by execution of steps S27 to S46 for calculation of the basic value KBS of the desired air-fuel ratio coefficient KCMD.

More specifically, first at the step S27 it is determined whether or not the vehicle speed VSP sensed by the VSP sensor 15 is higher than a predetermined value VX (e.g. 10 Km/h). If the answer is affirmative (YES), it is determined whether or not the engine rotational speed NE sensed by the NE sensor 11 is higher than a predetermined value NEX (e.g. 900 rpm) at the step S28. If NE > NEX, it is determined at the step S29 whether or not the difference $\Delta$PBA between an immediately preceding value $PBA_{(n-1)}$ of intake pipe absolute pressure PBA and a present value PBA(n) thereof is larger than a predetermined value $\Delta$PBX (e.g. 20 mmHg), i.e. whether or not the engine has suddenly shifted toward a lower load condition. If $\Delta$PBA > $\Delta$PBX, a first delay timer tmDLYBS is set to a predetermined time period T1 (e.g. 300 ms) and started at the step S30, and the basic value KBS of the desired air-fuel ratio coefficient KCMD is held at an immediately preceding value thereof, followed by the program proceeding to a step S42 in FIG. 5.

On the other hand, if at least one of the steps S27, S28, and S29 provides a negative answer, the program proceeds to a step S32 where the first delay timer tmDLYBS has counted up. If the answer is negative (NO), the program proceeds to the step S31, whereas if the answer is affirmative (YES), it is determined at the step S33 whether or not a flag FHIC assumes a value of 1 to indicate that the valve timing has been set to high-seed V/T. If the answer to the step S33 is affirmative (YES), i.e. if the valve timing is set to high-speed V/T, the KBSH map is retrieved to read a KBSM value therefrom and the read KBSM value is stored into the RAM of the memory means 5c.

Next, the program proceeds to the step S36 in FIG. 5 where it is determined whether or not the engine is in an idling condition. This determination is made, e.g. by checking whether or not the engine rotational speed NE is low (e.g. lower than 900 rpm) and at the same time the valve opening $\theta$TH of the throttle value 3' sensed by the $\theta$TH sensor 4 is lower than a predetermined idling speed $\theta$idl, or whether or not the engine rotational speed is low or lower than 900 rpm and at the same time the intake pipe absolute pressure PBA is lower than a predetermined value.

If the answer to this question of the step S36 is affirmative (YES), the program proceeds to the step S39, whereas if the answer is negative (NO), the program proceeds to the step S37 to determine whether or not the vehicle speed pulse width WP is larger than a predetermined value WPX to detect stoppage of the vehicle. A negative answer (NO) to the step S37 indicates that the vehicle stands still, and then a second delay timer tmDLYWLF is set to a predetermined time period T2 (e.g. 100 ms) and started at the step S39.

At the step S39, a determination is made as to whether or not the KBSM value read at the step S34 or S35 is smaller than a predetermined value KBSWLF (e.g. 1.1). If the answer is negative (NO), the program jumps to the step S42, whereas if the answer is affirmative (YES), the read KBS value is replaced by the predetermined value KBSWLF at the step S40, and then the program proceeds to the step S42. In this way, the basic value KBS is set to a value at least greater or richer than the predetermined value KBSWLF.

If the answer to the question to the step S37 is affirmative (YES), the program proceeds to the step S42 to determine whether or not the second delay timer tmDLYWLF has counted up the predetermined time period T2. If it has counted up, the program proceeds to the step S42, whereas if it has not yet counted up, the program proceeds to the step S39, and then through the step S40 to the step S42, similarly to the above.

Then, at the steps S42 to S46, correction of the KBS value is effected in dependence on the engine coolant temperature TW, in order to prevent leaning of the air-fuel ratio at low coolant temperature. First, at the step S42, it is determined whether or not the engine coolant temperature TW is lower than a predetermined value TWX. The predetermined value TWX is set at 70° C., for example, at which leaning of the air-fuel ratio is to be initiated. If TW < TWX, the KTWLAF map is retrieved in accordance with the engine coolant temperature TW and the intake pipe absolute pressure PBA to read a value of the desired air-fuel ratio coefficient KTWLAF to be applied at low coolant temperature at the step S43.

Figure 7:
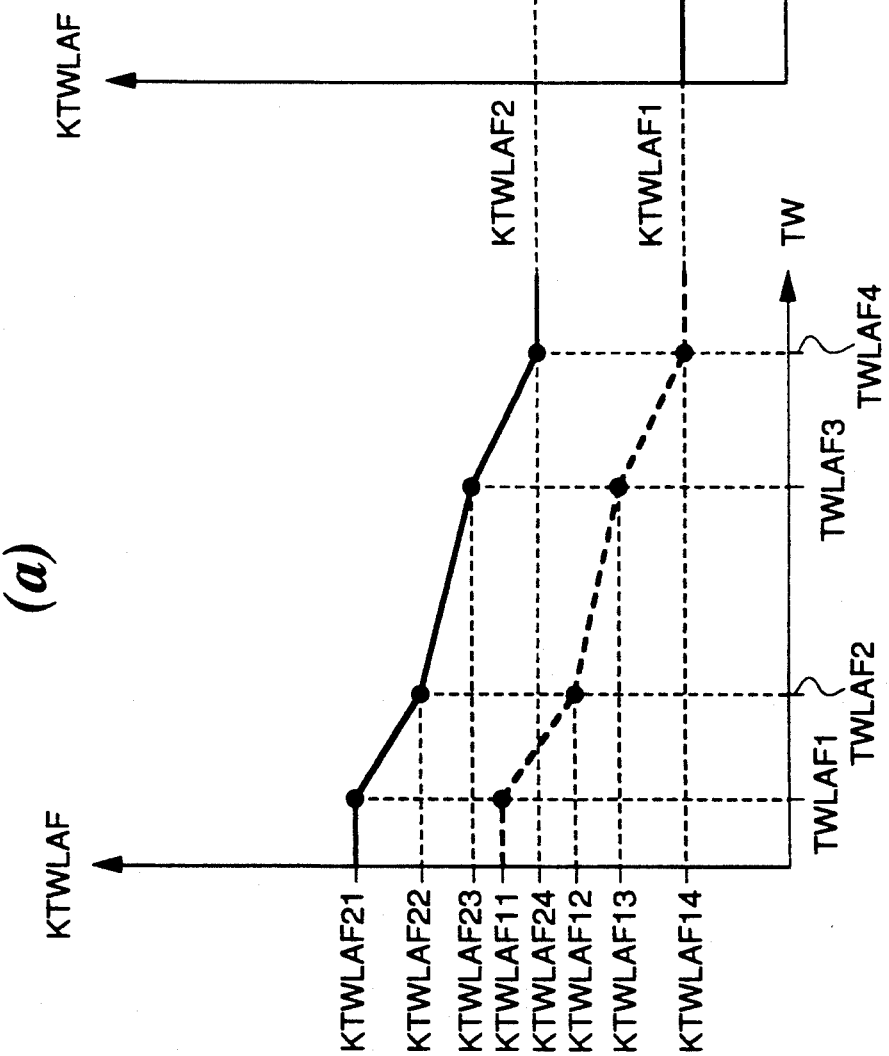
FIGS. 7(a) and 7(b) are a diagram showing a KTWLAF map for determining a desired air-fuel ratio coefficient KTWLAF applied at a low engine coolant temperature.

The KTWLAF map is set, e.g. as shown in FIG. 7. As shown in part (a) of the figure, there are provided a coefficient value line KTWLAF1 (indicated by the broken line) which is applied when the intake pipe absolute pressure PBA is below a predetermined value PBLAF1 and a coefficient value line KTWLAF2 (indicated by the solid line) which is applied when PBA is above a predetermined value PBLAF2. Further, predetermined values KTWLAF11, 21-KTWLAF14, 24 corresponding, respectively, to predetermined values TWLAF1-TWLAF4 of engine coolant temperature TW. Therefore, in the step S43, if PBA $\geq$ PBLAF2 or PBA $\leq$ PBLAF1 holds, a KTWLAF value on the line KTWLAF2 or KTWLAF1 is read out in accordance with the engine coolant temperature TW (in the case where the TW value falls between adjacent predetermined values, the KTWLAF value is calculated by interpolation), whereas if PBLAF1 < PBA < PBLAF2 holds, KTWLAF values on the lines KTWLAF2 and KTWLAF1 are read out in accordance with the coolant temperature TW and the read KTWLAF values are interpolated in accordance with the PBA value to obtain a value of KTWLAF. The KTWLAF values in the KTWLAF map are all so set as to obtain richer air-fuel ratios than the stoichiometric ratio. Therefore, by setting the basic value KBSM to the obtained KTWLAF value, the fuel injection amount will be increased at low coolant temperature.

Next, at the step S44, it is determined whether or not the KBSM value read at the step S34 or S35 is smaller than the KTWLAF value read at the step S43. If the answer is negative (NO), the basic value KBS of the desired air-fuel ratio coefficient KCMD is set to the KBSM value read at the step S34 or S35, at the step S45, and then the program proceeds to a step S47 in FIG. 6, whereas if the answer to the step S44 is affirmative (YES), the basic value KBS is set to the KTWLAF value read at the step S43, at the step S46, and then the program proceeds to the step S47.

If the answer to the question of the step S42 is negative (NO), the program proceeds to the step S47 without effecting the coolant temperature-dependent correction At the step S47, it is determined whether or not the engine is operating in a predetermined high load condition. This determination is carried out by a load condition-determining routine, not shown, in response to engine operating parameters.

Figure 8:
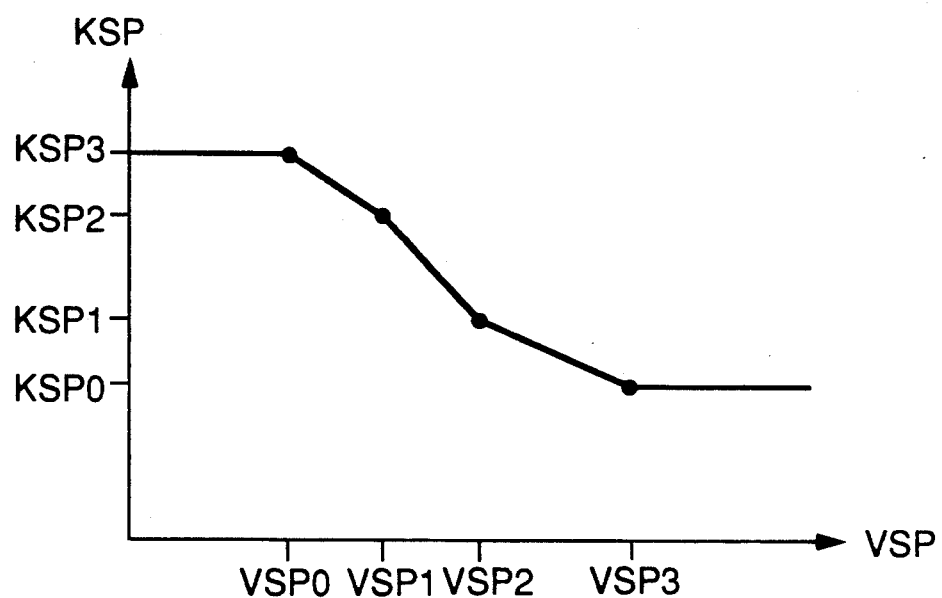
FIG. 8 is a diagram showing a KSP map for determining a vehicle speed-dependent coefficient KSP.

If the engine is in the predetermined high load condition, the desired air-fuel ratio coefficient KCMD is set to its basic value KBS at a step S48, and then the program provides to the step S51. On the other hand, if the answer to the question of the step S47 is negative (NO), i.e. if the engine is not in the predetermined high load condition, a KSP map is retrieved to read a value of the vehicle speed-dependent correction coefficient KSP therefrom (step S49). The KSP map is set, e.g. as shown in FIG. 8, such that there are provided predetermined values KSP0 to KSP3 of the vehicle speed-dependent coefficient KSP, corresponding, respectively, to predetermined vehicle speed values VSP0 to VSP3. By retrieving the KSP map in accordance with the vehicle speed VSP, and if required, by interpolation, a value of the vehicle speed-dependent correction coefficient KSP is obtained. In this connection, as is clear from FIG. 8, the lower the vehicle speed VSP, the larger value the coefficient KSP is set to.

Then, at a step S50, the KBS value obtained at the step S45 or S46 and the KSP value obtained at the step S49 are multiplied by the leaning coefficient KLS and the deceleration correction coefficient KDEC to calculate the desired air-fuel ratio coefficient KCMD (see the equation (4)), followed by the program proceeding to the step S51.

Figure 9:
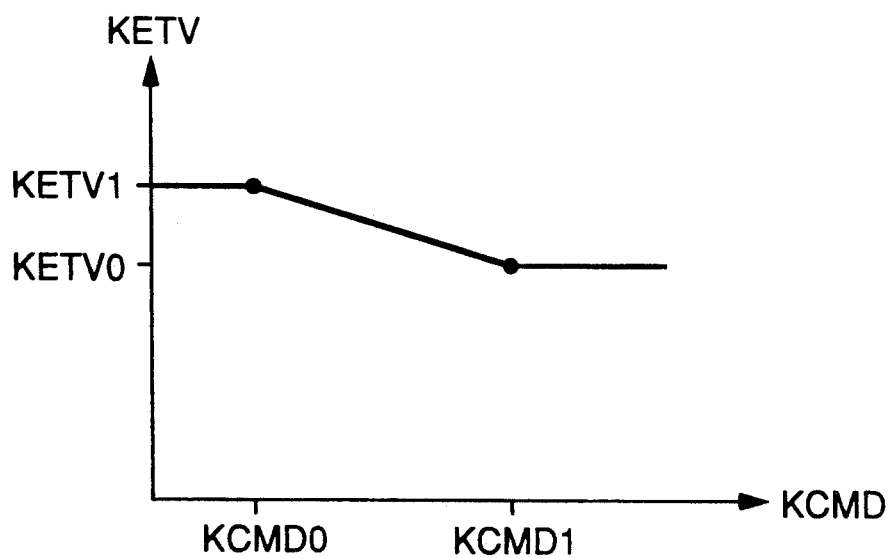
FIG. 9 is a diagram showing a KETV map for determining a fuel cooling-compensating coefficient KETV.

At the step S51, a KETV map is retrieved to read a value of the fuel cooling-compensating correction coefficient KETV therefrom. The KETV map is set, e.g. as shown in FIG. 9, such that there are provided predetermined values KETV0 to KETV1 corresponding, respectively, to predetermined values KCMD0 and KCMD1 of the desired air-fuel ratio coefficient KCMD. By thus obtaining a desired value of the coefficient KETV, the desired air-fuel ratio coefficient KCMD can be corrected to compensate for a variation in the intake air density due to the cooling effects of fuel injected into the intake pipe 2.

Then, in order to correct the air-fuel ratio for prevention of a torque shock upon changeover of the valve timing, an A/F correction routine is executed on the KCMD value at the time of changeover of the valve timing, at a step S52, as hereinafter described and then the corrected KCMD value is subjected to limit checking at a step S53. This limit checking is effected to ensure that the difference between an immediately preceding value of KCMD and a present value of same does not exceed an upper limit set in accordance with operating conditions of the engine and hence the KCMD value does not drastically vary. This KCMD limit checking includes enriching of the air-fuel ratio by the air-fuel ratio enriching means, as hereinafter described.

After the KCMD limit checking, the KCMD value and the KETV value are multiplied together to obtain a value of the corrected desired air-fuel ratio coefficient KCMDM, at a step S54, and then the program returns to the main routine of FIG. 3.

Figure 10:
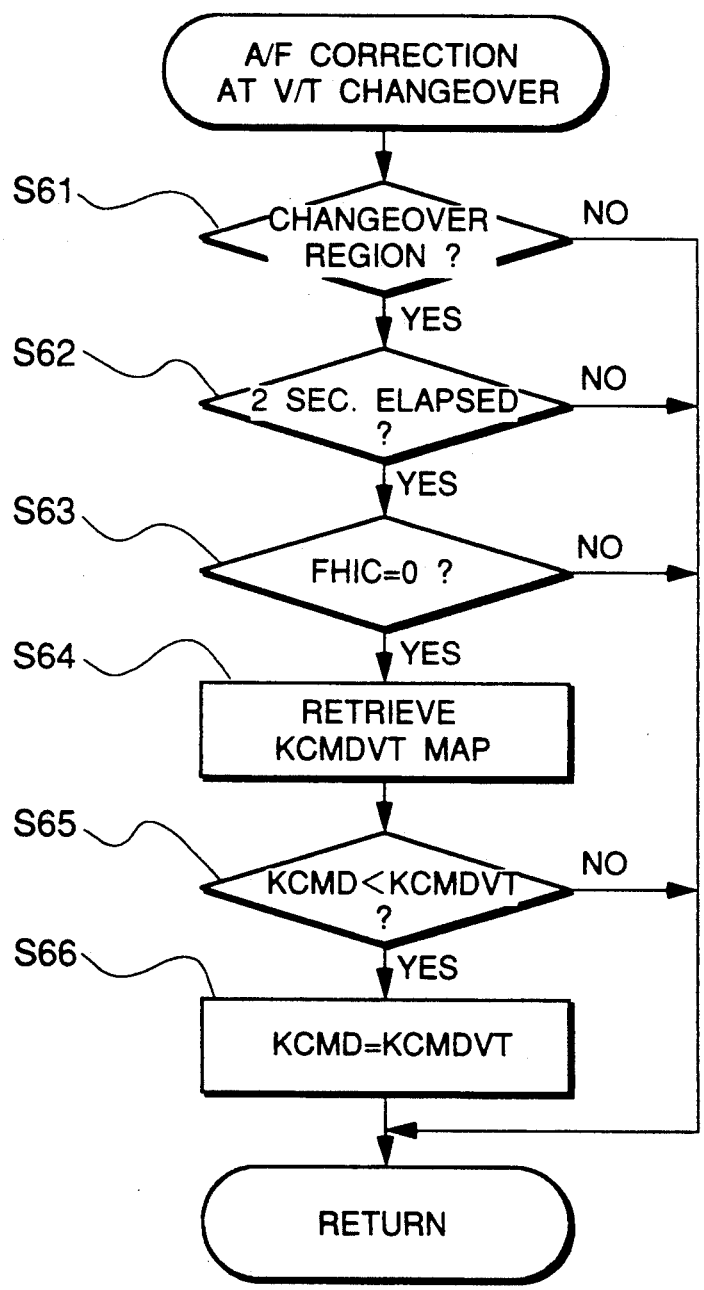
FIG. 10 is a flowchart showing a routine for correcting the air-fuel ratio at the time of changeover of the valve timing.

FIG. 10 shows the A/F correction routine executed at the time of changeover of the valve timing. This program is executed in synchronism with inputting of TDC signal pulses.

Figure 11:
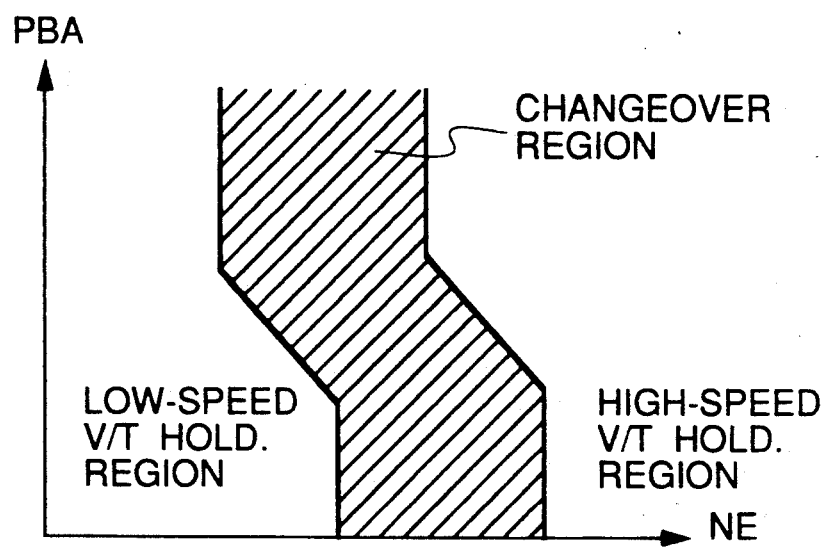
FIG. 11 is a graph showing a valve timing-changeover region.

First, at a step S61, it is determined whether or not the engine has entered a predetermined valve timing changeover region. The changeover region is defined, e.g. as shown in FIG. 11, by the engine rotational speed NE and the intake pipe absolute pressure PBA. In FIG. 11, the hatched region is the changeover region.

If the answer to the question of the step S61 is negative (NO), that is, if the engine operating condition is not in the changeover region but in the low-speed V/T holding region or the high-speed V/T holding region, the program is immediately terminated. On the other hand, if the engine is in the changeover region, it is determined at a step S62 whether or not a predetermined time period (e.g. 2 sec.) has elapsed after the engine entered the changeover region If the answer is negative (NO). the program is immediately terminated, whereas if the answer is affirmative (YES). it is determined at a step S63 whether or not the flag FHIC has been set to a value of 0. If the answer is negative (NO), that is, if the valve timing is currently set to the high-speed V/T, the program is immediately terminated, since in the case of changeover from high-speed V/T to low-speed V/T in the changeover region, the output torque lowers and hence almost no torque shock can occur. On the other hand, if the answer to the step S63 is affirmative (YES), that is, if the valve timing is currently set to the low-speed V/T, a KCMDVT map is retrieved to read a value of a desired air-fuel ratio coefficient KCMDVT for changeover region therefrom, and the read KCMDVT value is stored into the RAM of the memory means 5c.

Figure 12:
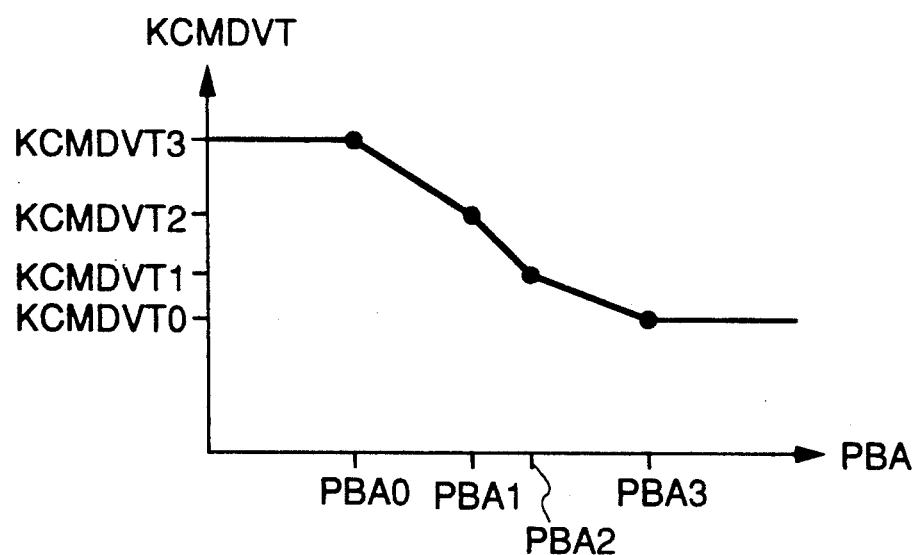
FIG. 12 is a diagram showing a KCMDVT map for determining a desired air-fuel ratio coefficient to be applied in the valve timing-changeover region.

The KCMDVT map is set, e.g. as shown in FIG. 12, in accordance with the intake pipe absolute pressure PBA, such that at the same value of PBA, a larger KCMD value is selected then a KCMD value to be selected at low-speed V/T. As is clear from FIG. 12, the lower the intake pipe pressure PBA, the greater value the KCMDVT is set to, i.e. the richer the air-fuel ratio.

Then, the program proceeds to a step S65 where it is determined whether or not the KCMD value obtained at the step S48 or S50 is smaller than the KCMDVT value. If the answer is negative (NO), the program is immediately terminated, whereas if the answer is affirmative (YES), the KCMDVT value is set to the desired air-fuel ratio coefficient KCMD at a step S66, followed by terminating the program. In other words, the KCMD value obtained at the step S48 or S50 is compared with the KCMDVT value obtained at the step S64, and the greater one of the two values is selected and set as the desired air-fuel ratio coefficient KCMD.

Thereafter, the KCMD value thus set is limit checked as hereinafter described, and then outputted, followed by changing the valve timing from low-speed V/T to high-speed V/T.

Figure 13:
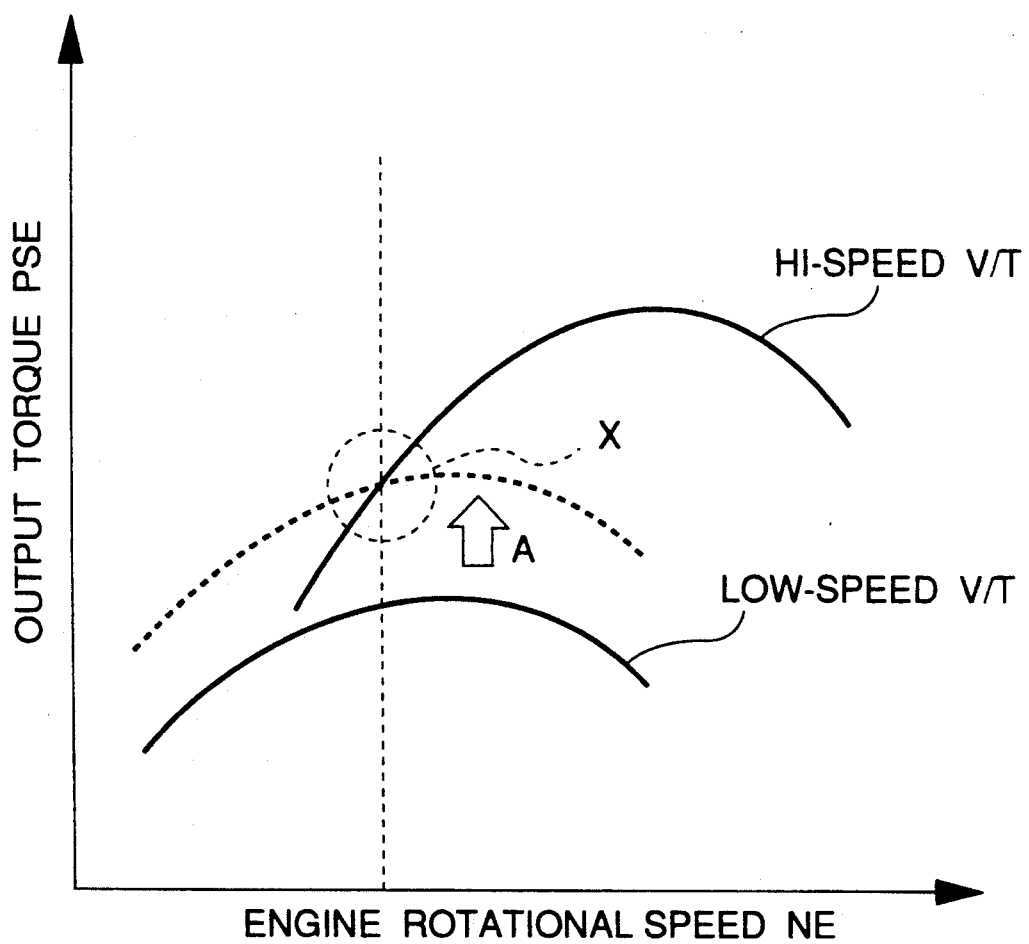
FIG. 13 is a graph useful in explaining a manner of changing the valve timing according to the invention.

FIG. 13 shows a manner of changeover from low-speed V/T to high-speed V/T, in which the abscissa represents the engine rotational speed NE, and the ordinate the output torque PSE.

According to the valve timing changing method described above, in changing the valve timing to high-speed V/T, first the air-fuel ratio is enriched to a richer value than the stoichiometric air-fuel ratio as indicated by the arrow A, and then the valve timing is changed to the high-speed V/T. Therefore, a torque shock occurring at changeover from low-speed V/T to high-speed V/T can be mitigated.

Figure 14:
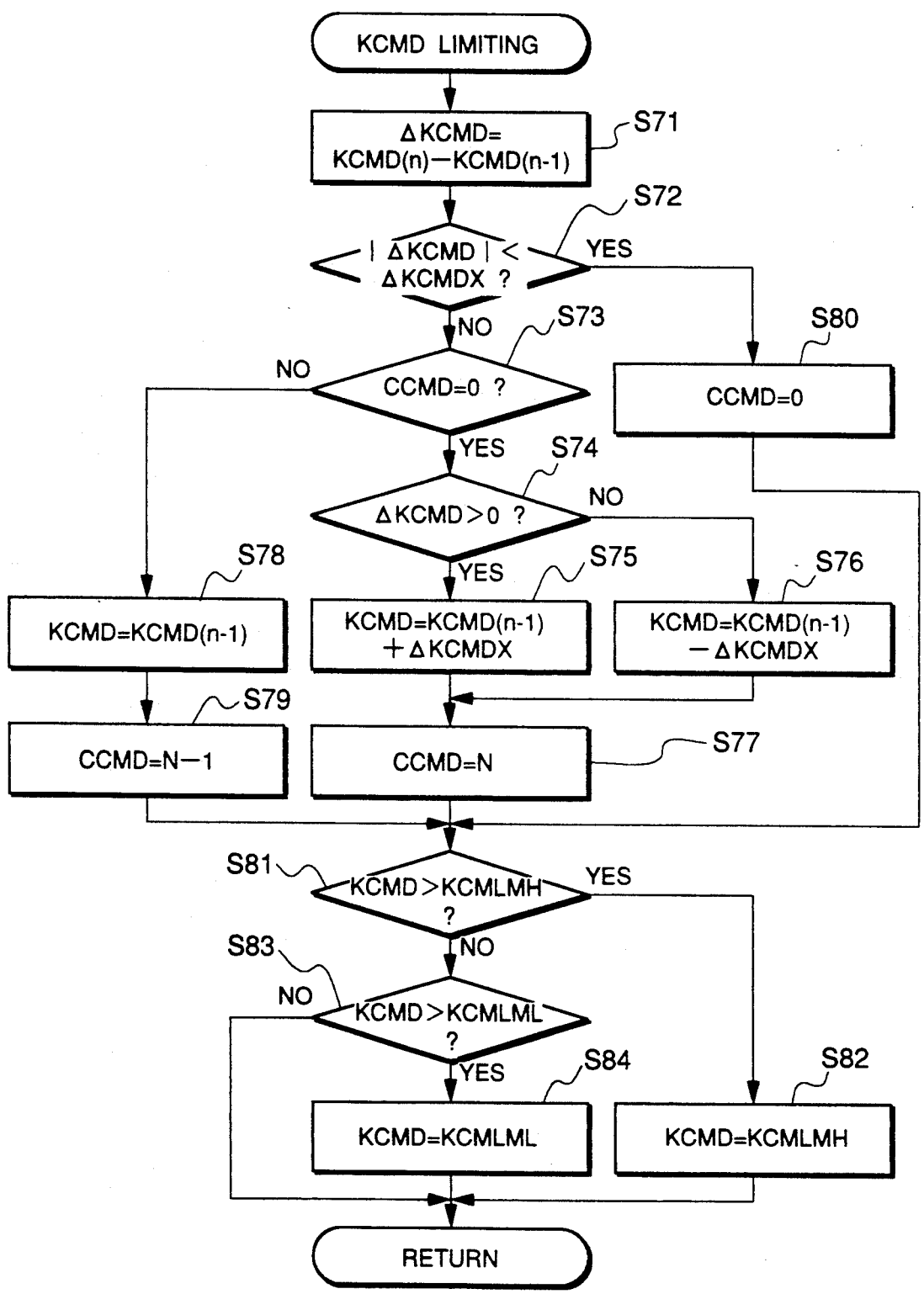
FIG. 14 is a flowchart showing a routine for limit checking a desired air-fuel ratio coefficient KCMD.

FIG. 14 shows a manner of limit-checking of the KCMD value. This program includes control means which effects usual limit checking, but also slowly or gradually varies the desired air-fuel ratio coefficient KCMD when the KCMD value suddenly and largely changes due to changeover of the valve timing. The program is executed in synchronism with inputting of TDC signal pulses.

First, at a step S71, the difference $\Delta KCMD$ between a present value $KCMD_{(n)}$ of the desired air-fuel ratio coefficient KCMD and an immediately preceding value of same is calculated, and at a step S72 it is determined whether or not the absolute value $|\Delta KCMD|$ of the difference $\Delta KCMD$ is smaller than a predetermined limit value $\Delta KCMDX$ (e.g. 0.14). If the answer to the step S72 is negative (NO), it is determined at a step S72 whether or not the count value of the counter CCMD is equal to 0. Since initially the count value of the counter CCMD is set to 0 in starting mode, as hereinbefore described with reference to the step S5 in FIG. 3, the answer to the question of the step S73 should be affirmative (YES) in the first loop of this program, and then the program proceeds to a step S74 where it is determined whether or not the difference $\Delta KCMD$ is larger than 0. If the answer is affirmative (YES), the air-fuel ratio is to be enriched (e.g. changeover from low-speed V/T to high-speed is to be effected), and then a value $KCMD_{(n-1)}$ of the desired air-fuel ratio coefficient KCMD obtained in the last loop is increased by the predetermined limit value $\Delta KCMDX$, and the increased KCMD value is stored into the RAM of the memory means 5c as a present KCMD value at a step S75, and the counter CCMD is set to a predetermined value N (e.g. 3). Then, the program proceeds to a step S81.

On the other hand, if the answer to the question of the step S73 is negative (NO), the KCMD value is held at the immediately preceding value $KCMD_{(n-1)}$ at a step S78, and the count value of the counter CCMD is decremented by 1 at a step S79. When in a subsequent loop the count value of the counter CCM becomes equal to 0, the loop formed by the steps S74, S75, and S77 is again executed to obtain a new value of the desired air-fuel ratio coefficient KCMD and store same into the RAM of the memory means 5c, followed by the program proceeding to the step S81.

When the answer to the question of the step S74 is negative (NO), the air-fuel ratio is to be leaned (e.g. changeover from high-speed V/T to low-speed V/T is to be effected), and then an immediately preceding value $KCMD_{(n-1)}$ of the desired air-fuel ratio coefficient KCMD is decreased by the predetermined limit value $\Delta KCMDX$ to obtain a present value of same at a step S76, followed by the program proceeding through the step S77 to the step S81, similarly to the above.

When the answer to the question of the step S72 is affirmative (YES), i.e. when the difference $\Delta KCMD$ is smaller than the predetermined limit value $\Delta KCMDX$, then the counter CCMD is set to 0, followed by the program proceeding to the step S81.

At the step S81, it is determined whether or not the KCMD value is larger than a predetermined upper limit value KCMLMH (e.g. 1.3). If the answer is affirmative (YES), the KCMD value is set to the predetermined upper limit value KCMLMH at a step S82, followed by terminating the program.

On the other hand, if the answer to the question of the step S81 is negative (NO), it is determined at a step S83 whether or not the KCMD value is smaller than a predetermined lower limit value KCMLML (e.g. 0.65). If the answer is negative (NO), the program is immediately terminated, whereas if the answer is affirmative (YES), the KCMD value is set to the predetermined lower limit value KCMLML at a step S84, followed by terminating the program. Then, the KCMD value is outputted upon completion of the limit checking. Thus, the desired air-fuel ratio coefficient KCMD gradually varies to the desired value.

Figure 15:
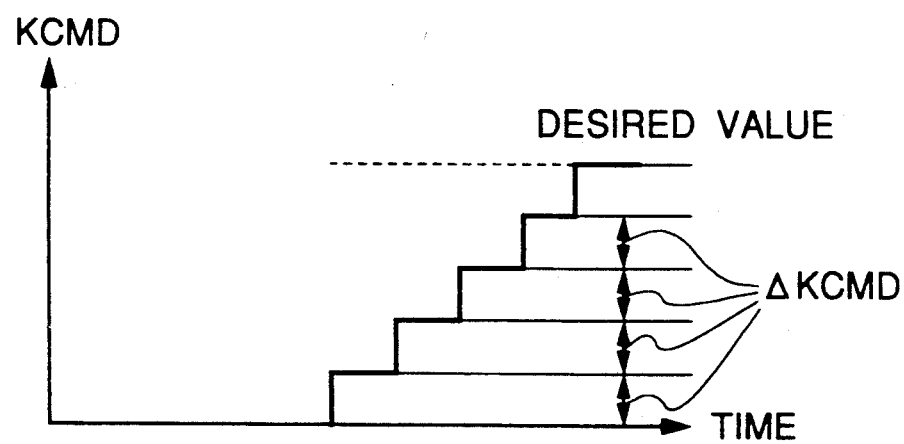
FIG. 15 is a diagram showing a manner of operation of enriching control means.

FIG. 15 shows a transient state of the KCMD value controlled for enriching the air-fuel ratio.

By thus gradually increasing the KCMD value by the value $\Delta KCMD$ to the desired value, an abrupt change in the output torque can be avoided even when the air-fuel ratio is enriched at changeover from low-speed V/T to high-speed V/T, thereby mitigating the torque shook.

Although omitted in the figures, in the above described embodiment, also in the case of changeover from high-speed V/T to low-speed V/T, the air-fuel ratio may be gradually leaned to mitigate the torque shock.

As described in detail above, according to the invention, when changeover from low-speed V/T to high-speed V/T is to be effected, first the air-fuel ratio changing means changes the desired air-fuel ratio to be applied when the low-speed V/T is selected, to one to be applied when the high-speed V/T is selected, and then the valve timing is changed from the low-speed V/T to the high-speed V/T with the desired air-fuel ratio thus changed. That is, first the air-fuel ratio is enriched, and then the valve timing is changed from the low-speed V/T to the high-speed V/T.

As a result, the valve timing can be changed from the low-speed V/T to the high-speed V/T in an optimal manner, i.e. smoothly without a drop in the output torque, thereby enabling to mitigate a torque shock occurring at the changeover from the low-speed V/T to the high-speed V/T.

Further, the time measuring means measures time elapsed after the engine entered the changeover region, and when the measured time reaches a predetermined time period, the air-fuel ratio changing means changes the desired air-fuel ratio as above. As a result, the desired air-fuel ratio can be changed only when the engine operative state becomes stable after changeover of the valve timing.

Moreover, the air-fuel ratio enriching means gradually enriches the desired air-fuel ratio. Therefore, the air-fuel ratio can be slowly brought to the desired value to more effectively mitigate a torque shock caused by a change in the air-fuel ratio.

What is claimed is:

1. An air-fuel ratio control system for an internal combustion engine having at least one intake valve, and valve timing changing means for changing valve timing of said at least one intake valve at least between low-speed valve timing suitable for operation of said engine in a low engine rotational speed region, and high-speed valve timing suitable for operation of said engine in a high engine rotational speed region, the system comprising:
operating condition detecting means for detecting operating conditions of said engine;
air fuel ratio calculating means for calculating a desired air-fuel ratio of a mixture supplied to said engine in response to the detected operating conditions of said engine;
changeover detecting means for detecting whether or not said engine has entered a predetermined changeover region in which said valve timing is to be changed; and air-fuel ratio changing means for changing said desired air-fuel ratio when it is detected that said engine has entered said predetermined changeover region;

wherein when changeover is to be effected from said low-speed valve timing to said high-speed valve timing, said air-fuel ratio changing means changes said desired air-fuel ratio to be applied when said low-speed valve timing is selected, to one to be applied when said high-speed valve timing is selected, and said valve timing changing means changes said valve timing to said high-speed valve timing after said desired air-fuel ratio has been changed to said one to be applied when said high-speed valve timing is selected.

2. An air-fuel ratio control system as claimed in claim 1, wherein in said changeover region, said desired air-fuel ratio to be applied when said high-speed valve timing is selected is set to a richer value than said desired air-fuel ratio to be applied when said low-speed valve timing is selected.

3. An air-fuel ratio control system as claimed in claim 1, wherein said air-fuel ratio changing means progressively enriches said desired air-fuel ratio.

4. An air-fuel ratio control system as claimed in claim 3, wherein said air-fuel ratio changing means progressively enriches said desired air-fuel ratio when a difference between a value of said desired air-fuel ratio assumed upon detection of entrance of said engine to said predetermined changeover region and an immediately preceding value thereof is larger than a predetermined value.

5. An air-fuel ratio control system as claim in any of claims 1 to 4, including time measuring means for measuring time elapsed after said engine entered said predetermined changeover region, and wherein after said measured time has reached a predetermined time period, said air-fuel ratio changing means changes said desired air-fuel ratio.

6. An air-fuel ratio control system as claimed in any of claims 1 to 4, wherein said engine operating condition detecting means includes rotational speed detecting means for detecting the rotational speed of said engine, and load condition detecting means for detecting a load condition of said engine, and wherein said predetermined changeover region is set based upon the rotational speed of said engine detected by said rotational speed detecting means and said load condition of said engine detected by said load condition detecting means.

7. An air-fuel ratio control system as claim in any of claims 1 to 4, including load condition detecting means for detecting a load condition of said engine, and wherein a value of said desired air-fuel ratio to which said air-fuel ratio changing means changes said desired air-fuel ratio is set based upon said load condition detected by said load condition detecting means.

* * * * *